(12) United States Patent
Zheng et al.

(10) Patent No.: US 12,117,545 B2
(45) Date of Patent: Oct. 15, 2024

(54) METHOD FOR ESTIMATING DIRECTION OF ARRIVAL OF AN L-TYPE COPRIME ARRAY BASED ON COUPLED TENSOR DECOMPOSITION

(71) Applicant: Zhejiang University, Zhejiang (CN)

(72) Inventors: Hang Zheng, Zhejiang (CN);
Chengwei Zhou, Zhejiang (CN);
Zhiguo Shi, Zhejiang (CN); Jiming Chen, Zhejiang (CN)

(73) Assignee: Zhejiang University, Zhejiang (CN)

( * ) Notice: Subject to any disclaimer, the term of this patent is extended or adjusted under 35 U.S.C. 154(b) by 275 days.

(21) Appl. No.: 17/799,930

(22) PCT Filed: Jul. 12, 2021

(86) PCT No.: PCT/CN2021/105699
§ 371 (c)(1),
(2) Date: Aug. 16, 2022

(87) PCT Pub. No.: WO2023/279411
PCT Pub. Date: Jan. 12, 2023

(65) Prior Publication Data
US 2023/0213606 A1      Jul. 6, 2023

(30) Foreign Application Priority Data

Jul. 9, 2021 (CN) .......................... 202110781692.8

(51) Int. Cl.
*G01S 3/14* (2006.01)
(52) U.S. Cl.
CPC .................... *G01S 3/143* (2013.01)
(58) Field of Classification Search
CPC ... G01S 3/14; G01S 3/74; G01S 3/043; G01S 3/143; G01S 3/8006
(Continued)

(56) References Cited

U.S. PATENT DOCUMENTS

| 11,300,648 B2* | 4/2022 | Zhou ........................ G01S 3/043 |
| 2023/0213606 A1* | 7/2023 | Zheng ..................... G01S 3/143 |
| | | 342/417 |

FOREIGN PATENT DOCUMENTS

| CN | 111610486 | 9/2020 |
| CN | 111624545 | 9/2020 |

(Continued)

OTHER PUBLICATIONS

Gui Yufeng et al., "Two-dimensional coprime vector-sensor array signal processing based on tensor decompositions", Journal of Nanchang Institute of Technology, Aug. 2019, submit with English abstract, pp. 83-91.

(Continued)

*Primary Examiner* — Bo Fan
(74) *Attorney, Agent, or Firm* — JCIPRNET

(57) ABSTRACT

The disclosure provides a method for estimating a direction of arrival of an L-type coprime array based on coupled tensor decomposition. The method includes: constructing an L-type coprime array with separated sub-arrays and modeling a received signal; deriving a fourth-order covariance tensor of the received signal of the L-type coprime array; deriving a fourth-order virtual domain signal corresponding to an augmented virtual uniform cross array; dividing the virtual uniform cross array by translation; constructing a coupled virtual domain tensor by stacking a translation virtual domain signal; and obtaining a direction of arrival estimation result by coupled virtual domain tensor decomposition. The present invention makes full use of the spatial correlation property of the virtual domain tensor statistics of the constructed L-type coprime array with the separated sub-arrays, and realizes high-precision two-dimensional direction of arrival estimation by coupling the virtual (Continued)

domain tensor processing, which can be used for target positioning.

7 Claims, 4 Drawing Sheets

(58) Field of Classification Search
USPC .... 342/417, 450, 457, 70, 357.52, 195, 159, 342/109
See application file for complete search history.

(56) References Cited

FOREIGN PATENT DOCUMENTS

| | | |
|---|---|---|
| CN | 112269172 | 1/2021 |
| CN | 112904272 | 6/2021 |

OTHER PUBLICATIONS

Hang Zheng et al., "2-D DOA Estimation for Coprime Cubic Array: A Cross-correlation Tensor Perspective", Proceedings of ISAP2020, Osaka, Japan, Nov. 2020, pp. 1-2.
"International Search Report (Form PCT/ISA/210) of PCT/CN2021/105699," mailed on Mar. 28, 2022, pp. 1-5.
"Written Opinion of the International Searching Authority (Form PCT/ISA/237) of PCT/CN2021/105699," mailed on Mar. 28, 2022, pp. 1-4.

* cited by examiner

METHOD FOR ESTIMATING DIRECTION OF ARRIVAL OF AN L-TYPE COPRIME ARRAY BASED ON COUPLED TENSOR DECOMPOSITION

CROSS-REFERENCE TO RELATED APPLICATION

This application is a 371 of international application of PCT application serial no. PCT/CN2021/105699, filed on Jul. 12, 2021, which claims the priority benefit of China application no. 202110781692.8, filed on Jul. 9, 2021. The entirety of each of the above mentioned patent applications is hereby incorporated by reference herein and made a part of this specification.

FIELD OF TECHNOLOGY

The present invention belongs to the technical field of array signal processing, in particular relates to a statistical signal processing technology based on high-order statistics of a multi-dimensional sparse array virtual domain, which is specifically a method for estimating direction of arrival of an L-type coprime array based on coupled tensor decomposition, and can be used for target positioning.

BACKGROUND

As a sparse array with a systematic structure, a coprime array has the advantages of a large aperture, high resolution, and high degree of freedom. It can break through the limitation of a Nyquist sampling rate and improve the comprehensive performance of direction of arrival estimation. In order to realize the direction of arrival estimation matching the Nyquist sampling rate in a coprime array scenario, a common practice is to derive a received signal of the coprime array into a second-order statistic model, and construct an augmented virtual uniform array to realize the direction of arrival estimation based on virtual domain signal processing. However, existing methods usually model the received signal as a vector and derive the virtual domain signal by vectorizing a received signal covariance matrix. In the scenario of deploying a multi-dimensional coprime array, since the received signal covers multi-dimensional space-time information, not only the processing method of the vectorized signal loses structural information of the received signal of the coprime array, but also the virtual domain signal model derived by vectorization has problems such as a structural damage and excessive linear scale. On the other hand, since the virtual domain signal corresponding to the virtual uniform array is a single snapshot signal, the virtual domain signal statistics have a rank-deficient problem. In order to solve this problem, a traditional method based on spatial smoothing divides the virtual domain signal, and performs average statistical processing on the divided virtual domain signal to obtain full-rank virtual domain signal statistics, so as to achieve effective direction of arrival estimation. However, this kind of approaches often ignore spatial correlation property between the divided virtual domain signals, and the statistical averaging processes cause performance loss.

In response to the above problems, in order to preserve the structured information of multi-dimensional received signals, a tensor, as a multi-dimensional data type, has been applied in the field of array signal processing to characterize received signals covering complex electromagnetic information. By performing multi-dimensional feature extraction on the tensor, high-precision direction of arrival estimation can be achieved. However, the existing tensor signal processing methods are only effective under the premise of matching the Nyquist sampling rate, and have not yet involved the statistical analysis of coprime array sparse signals and their virtual domain expansion. On the other hand, traditional tensor signal feature extraction methods often decompose a single independent tensor, and when there are multiple tensor signals with spatial correlation properties, there is no effective multi-dimensional feature joint extraction method. Therefore, how to combine virtual domain tensor modeling and virtual domain signal correlation processing in the scenario of multi-dimensional coprime arrays to achieve high-precision two-dimensional direction of arrival estimation is still an urgent problem to be solved.

SUMMARY

The purpose of the present invention is to propose a method for estimating direction of arrival of an L-type coprime array based on coupled tensor decomposition, aiming at the problems of the multi-dimensional signal structure damage and virtual domain signal correlation information loss existing in the existing methods. It provides a feasible idea and an effective solution to realize high-precision two-dimensional direction of arrival estimation by establishing a relationship between L-type coprime array augmented virtual domain and tensor signal modeling, and fully mining the correlation information of tensor statistics in multi-dimensional virtual domain.

The purpose of this invention is realized through the following technical solutions: a method for estimating direction of arrival of an L-type coprime array based on coupled tensor decomposition, wherein, the method comprises the following steps:

(1) using $2M_{\mathbb{L}_1}+N_{\mathbb{L}_1}+2M_{\mathbb{L}_2}+N_{\mathbb{L}_2}-2$ physical antenna array elements by a receiving end to construct the L-type coprime array with separated sub-arrays, wherein the L-type coprime array consists of two coprime linear arrays $\mathbb{L}_i$, i=1, 2 located on the x-axis and the y-axis, wherein the first array elements of the two coprime linear arrays $\mathbb{L}_1$ and $\mathbb{L}_2$ are laid out from positions (1, 0) and (1, 0) in an xoy coordinate system respectively; the coprime linear array $\mathbb{L}_i$ contains $|\mathbb{L}_i|=2M_{\mathbb{L}_i}+N_{\mathbb{L}_i}-1$ array elements, wherein, $M_{\mathbb{L}_i}$ and $N_{\mathbb{L}_i}$ are a pair of coprime integers, $|\cdot|$ represents the potential of the set; $\{(x_{\mathbb{L}_1}, 0) | x_{\mathbb{L}_1} = [q_{\mathbb{L}_1}^{(1)}, q_{\mathbb{L}_1}^{(2)}, \ldots, q_{\mathbb{L}_1}^{(|\mathbb{L}_1|)}]d\}$ and $\{(0, y_{\mathbb{L}_2}) | y_{\mathbb{L}_2} = [q_{\mathbb{L}_2}^{(1)}, q_{\mathbb{L}_2}^{(2)}, \ldots, q_{\mathbb{L}_2}^{(|\mathbb{L}_2|)}]d\}$ are respectively used to represent the positions of each array element in the L-type coprime array on the x-axis and y-axis, wherein, $q_{\mathbb{L}_1}^{(1)} = q_{\mathbb{L}_2}^{(1)} = 1$, the unit interval d is taken as a half of the wavelength of incident narrowband signal;

assuming that there are K far-field narrow-band incoherent signal sources from $\{(\theta_1, \varphi_1), (\theta_2, \varphi_2), \ldots, (\theta_K, \varphi_K)\}$ directions, modeling a received signal of the coprime linear array $\mathbb{L}_i$ forming the L-type coprime array as:

$$X_{\mathbb{L}_i} = \sum_{k=1}^{K} a_{\mathbb{L}_i}(k) \circ s_k + N_{\mathbb{L}_i} \in \mathbb{C}^{|\mathbb{L}_i| \times T},$$

wherein, $s_k=[s_{k,1}, s_{k,2}, \ldots, s_{k,T}]^T$ is a multi-snapshot sampling signal waveform corresponding to a kth incident signal source, T is the number of sampling snapshots, ○ represents an outer product of the vector, $N_{\mathbb{L}_i}$ is a noise independent of each signal source, $a_{\mathbb{L}_i}(k)$ is a steering vector of $\mathbb{L}_i$, and corresponds to a signal source with an incoming wave direction being $(\theta_k, \varphi_k)$, and is expressed as:

$$a_{\mathbb{L}_i}(k) = \left[ e^{-j\pi q_{\mathbb{L}_i}^{(1)}\mu_i(k)}, e^{-j\pi q_{\mathbb{L}_i}^{(2)}\mu_i(k)}, \ldots, e^{-j\pi q_{\mathbb{L}_i}^{(|\mathbb{L}_i|)}\mu_i(k)} \right]^T,$$

wherein $\mu_1(k)=\sin(\varphi_k)\cos(\theta_k)$, $\mu_2(k)=\sin(\varphi_k)\sin(\theta_k)$, $j=\sqrt{-1}$, $[\cdot]^T$ represents a transpose operation;

(2) by solving cross-correlation statistics of $X_{\mathbb{L}_1}$ and $X_{\mathbb{L}_2}$, obtaining a second-order cross-correlation matrix $\mathbb{C}^{|\mathbb{L}_1|\times|\mathbb{L}_2|\times|\mathbb{L}_1|\times|\mathbb{L}_2|} \in \mathbb{C}^{|\mathbb{L}_1|\times|\mathbb{L}_2|}$;

$$R_{\mathbb{L}_1\mathbb{L}_2} = E\{X_{\mathbb{L}_1} X_{\mathbb{L}_2}^H\} = \sum_{k=1}^{K} \sigma_k^2 a_{\mathbb{L}_1}(k) \circ a_{\mathbb{L}_2}^*(k),$$

wherein, $\sigma_k^2=E\{s_k(t)s^*_k(t)\}$ represents the power of the kth incident signal source, $E\{\cdot\}$ represents a mathematical expectation operation. $(\cdot)^H$ represents a conjugate transpose operation, $(\cdot)^*$ represents a conjugate operation, and on the basis of the second-order cross-correlation matrix, fourth-order statistic of the L-type coprime array with the separated sub-arrays is derived, that is, a fourth-order covariance tensor $\mathcal{R} \in \mathbb{C}^{|\mathbb{L}_1|\times|\mathbb{L}_2|\times|\mathbb{L}_1|\times|\mathbb{L}_2|}$ is obtained by calculating the autocorrelation of the second-order cross-correlation matrix $R_{\mathbb{L}_1\mathbb{L}_2}$:

$$\mathcal{R} = R_{\mathbb{L}_1\mathbb{L}_2} \circ R_{\mathbb{L}_1\mathbb{L}_2}^* =$$

$$E\{(X_{\mathbb{L}_1} X_{\mathbb{L}_2}^H) \circ (X_{\mathbb{L}_1} X_{\mathbb{L}_2}^H)^*\} = \sum_{k=1}^{K} \sigma_k^4 a_{\mathbb{L}_1}(k) \circ a_{\mathbb{L}_2}^*(k) \circ a_{\mathbb{L}_1}^*(k) \circ a_{\mathbb{L}_2}^*(k);$$

(3) defining dimension sets $\mathbb{J}_1=\{1, 3\}$, $\mathbb{J}_2=\{2, 4\}$ and obtaining a fourth-order virtual domain signal $V_\mathbb{V} \in \mathbb{C}^{|\mathbb{L}_1|^2 \times |\mathbb{L}_2|^2}$ by performing a tensor transformation of dimension merging on the fourth-order covariance tensor $\mathcal{R}$:

$$V_\mathbb{V} \triangleq \mathcal{R}_{\{J_1, J_2\}} = \sum_{k=1}^{K} \sigma_k^4 [a_{\mathbb{L}_1}^*(k) \otimes a_{\mathbb{L}_1}(k)] \circ [a_{\mathbb{L}_2}(k) \otimes a_{\mathbb{L}_2}^*(k)],$$

wherein, by forming a difference set array on an exponential term, $a_{\mathbb{L}_1}^*(k) \otimes a_{\mathbb{L}_1}(k)$ and $a_{\mathbb{L}_2}(k) \otimes a_{\mathbb{L}_2}^*(k)$ each constructs an augmented non-continuous virtual linear array on the x axis and y axis, $\otimes$ represents a Kronecker product. $V_\mathbb{V}$ corresponds to a two-dimensional non-continuous virtual cross array $\mathbb{V}$, $\mathbb{V}$ contains a virtual uniform cross array $\mathbb{G} = \mathbb{G}_x \cup \mathbb{G}_y$, wherein $\mathbb{G}_x$ and $\mathbb{G}_y$ are each a virtual uniform linear array on the x axis and y axis; the positions of all virtual array elements in the $\mathbb{G}_x$ and $\mathbb{G}_y$ are expressed as $\mathbb{G}_x = \{(\mathbb{C}^{|\mathbb{G}_x|\times|\mathbb{G}_y|}, 0) |$ $\mathbb{C}^{|\mathbb{G}_x|\times|\mathbb{G}_y|} = [q_{\mathbb{G}_x}^{(1)}, q_{\mathbb{G}_x}^{(2)}, \ldots, q_{\mathbb{G}_x}^{(|\mathbb{G}_x|)}]d\}$ and $\mathbb{G}_y = \{(0, y_\mathbb{G}) | y_\mathbb{G} = [q_{\mathbb{G}_y}^{(1)}, q_{\mathbb{G}_y}^{(2)}, \ldots, q_{\mathbb{G}_y}^{(|\mathbb{G}_y|)}]d\}$, wherein $q_{\mathbb{G}_x}^{(1)} = -M_{\mathbb{L}_1} N_{\mathbb{L}_1} - M_{\mathbb{L}_1}+2$, $q_{\mathbb{G}_x}^{(|\mathbb{G}_x|)} = M_{\mathbb{L}_1} N_{\mathbb{L}_1} + M_{\mathbb{L}_1}$, $q_{\mathbb{G}_y}^{(1)} = -M_{\mathbb{L}_2} N_{\mathbb{L}_2} - M_{\mathbb{L}_2}+2$, $q_{\mathbb{G}_y}^{(|\mathbb{G}_y|)} = M_{\mathbb{L}_2} N_{\mathbb{L}_2} + M_{\mathbb{L}_2}$, and $|\mathbb{G}_x|=2(M_{\mathbb{L}_1} N_{\mathbb{L}_1}+M_{\mathbb{L}_1})-1$, $|\mathbb{G}_y|=2(M_{\mathbb{L}_2} N_{\mathbb{L}_2}+M_{\mathbb{L}_2})-1$;

extracting an element corresponding to the position of each virtual array element in the virtual uniform cross array $\mathbb{G}$ from the virtual domain signal $V_\mathbb{V}$ of the non-continuous virtual cross array $\mathbb{V}$, and obtaining a virtual domain signal $\overline{V}_\mathbb{G} \in x_\mathbb{G}$ corresponding to $\mathbb{G}$, which is modeled as:

$$\overline{V}_\mathbb{G} = \sum_{k=1}^{K} \sigma_k^4 b_x(k) \circ b_y(k),$$

wherein, $$b_x(k) = \left[ e^{-j\pi q_{\mathbb{G}_x}^{(1)}\mu_1(k)}, e^{-j\pi q_{\mathbb{G}_x}^{(2)}\mu_1(k)}, \ldots, e^{-j\pi q_{\mathbb{G}_x}^{(|\mathbb{G}_x|)}\mu_1(k)} \right]^T,$$

$$b_y(k) = \left[ e^{-j\pi q_{\mathbb{G}_y}^{(1)}\mu_2(k)}, e^{-j\pi q_{\mathbb{G}_y}^{(2)}\mu_2(k)}, \ldots, e^{-j\pi q_{\mathbb{G}_y}^{(|G_y|)}\mu_2(k)} \right]^T,$$

are steering vectors of $\mathbb{G}_x$ and $\mathbb{G}_y$, respectively;

(4) respectively extracting sub-arrays $\mathbb{G}_x^{(1)}=\{(x_\mathbb{G}^{(1)}, 0) | x_\mathbb{G}^{(1)} = [1, 2, \ldots, q_{\mathbb{G}_x}^{(|\mathbb{G}_x|)}]d\}$, $\mathbb{G}_y^{(1)}=\{(0, y_\mathbb{G}^{(1)}) | y_\mathbb{G}^{(1)} = [1, 2, \ldots, q_{\mathbb{G}_y}^{(|\mathbb{G}_y|)}]d\}$ from $\mathbb{G}_x$ and $\mathbb{G}_y$ as translation windows; translating the translation windows $\mathbb{G}_x^{(1)}$ and $\mathbb{G}_y^{(1)}$ along negative semi-axis directions of the x axis and the y axis by a virtual array element interval one by one to obtain $P_x$ virtual uniform linear sub-arrays $\mathbb{G}_x^{(p_x)}=\{(x_\mathbb{G}^{(p_x)}, 0) | x_\mathbb{G}^{(p_x)} = [2-p_x, 3-p_x, \ldots, q_{\mathbb{G}_x}^{(|\mathbb{G}_x|)}+1-p_x]d\}$ and $P_y$ virtual uniform linear sub-arrays $\mathbb{G}_y^{(p_y)}=\{(0, y_\mathbb{G}^{(p_y)}) | y_\mathbb{G}^{(p_y)} = [2-p_y, 3-p_y, \ldots, q_{\mathbb{G}_y}^{(|\mathbb{G}_y|)}+1-p_y]d\}$, wherein $P_x=(|\mathbb{G}_x|+1)/2$, $P_y=(|\mathbb{G}_y|+1)/2$; then the virtual domain signal of the virtual uniform sub-array $\widetilde{\mathbb{G}}_{(p_x,p_y)}=\mathbb{G}_x^{(p_x)} \cup \mathbb{G}_y^{(p_y)}$ can be expressed as:

$$U_{\widetilde{\mathbb{G}}(p_x,p_y)} = \sum_{k=1}^{K} \sigma_k^4 g_x^{(p_x)}(k) \circ g_y^{(p_y)}(k) \in \mathbb{C}^{|\mathbb{G}_x^{(p_x)}| \times |\mathbb{G}_y^{(p_y)}|},$$

wherein, $$g_x^{(p_x)}(k) = \left[ e^{-j\pi(2-p_x)\mu_1(k)}, e^{-j\pi(3-p_x)\mu_1(k)}, \ldots, e^{-j\pi\left(q_{\mathbb{G}_x}^{(|\mathbb{G}_x|)}+1-p_x\right)\mu_1(k)} \right]^T,$$

$$g_y^{(p_y)}(k) = \left[ e^{-j\pi(2-p_y)\mu_2(k)}, e^{-j\pi(3-p_y)\mu_2(k)}, \ldots, e^{-j\pi\left(q_{\mathbb{G}_y}^{(|\mathbb{G}_y|)}+1-p_y\right)\mu_2(k)} \right]^T,$$

are steering vectors of $\mathbb{G}_x^{(p_x)}$ and $\mathbb{G}_y^{(p_y)}$, respectively;

(5) for $P_y$ virtual uniform sub-arrays $\widetilde{\mathbb{G}}_{(p_x, :)}$ with the same subscript $p_x$, superimposing corresponding virtual domain signals $U_{\widetilde{\mathbb{G}}(p_x, :)}$, thereof in a third dimension to obtain $P_x$ three-dimensional coupled virtual domain tensors $\mathcal{U}_{(p_x)} \in \mathbb{C}^{|\mathbb{G}_x^{(p_x)}| \times |\mathbb{G}_y^{(1)}| \times P_y}$:

$$\mathcal{U}_{(p_K)} = \left[ U_{\widetilde{\mathbb{G}}(1,p_y)}, U_{\widetilde{\mathbb{G}}(2,p_y)}, \ldots, U_{\widetilde{\mathbb{G}}(p_x,p_y)} \right]_{\sqcup_3} =$$

$$\sum_{k=1}^{K} \sigma_k^4 g_x^{(p_x)}(k) \circ g_y^{(1)}(k) \circ q_y(k) = \left[\!\left[ \sigma_k^4; G_x^{(p_x)}, G_y^{(1)}, Q_y \right]\!\right],$$

wherein, $g_y^{(1)}(k)$ is a guiding vector of the translation window $\mathbb{G}_y^{(1)}$, $q_y(k) = [1, e^{j\pi\mu_2(k)}, \ldots, e^{j\pi(P_y-1)\mu_2(k)}]^T$ represents a translation factor along an axis direction of y, and $G_x^{(p_x)} = [g_x^{(p_x)}(1), g_x^{(p_x)}(2), \ldots, g_x^{(p_x)}(K)]$, $G_y^{(1)} = [g_y^{(1)}(1), g_y^{(1)}(2), \ldots, g_y^{(1)}(K)]$ and $Q_y = [q_y(1), q_y(2), \ldots, q_y(K)]$ are factor matrices of $\mathcal{U}_{(p_x)}$, $[\cdot]_{\sqcup_a}$ represents a tensor superposition operation on the $a^{th}$ dimension, and $[\![\cdot]\!]$ represents a canonical polyadic model of the tensor;

(6) performing a coupled canonical polyadic decomposition on the constructed $P_x$ coupled virtual domain tensors $\mathcal{U}_{(p_x)}$ to obtain an estimated value $\{\hat{G}_x^{(p_x)}, \hat{G}_y^{(1)}, \hat{Q}_y\}$ of the factor matrices $\{G_x^{(p_x)}, G_y^{(1)}, Q_y\}$, which includes an estimated value $\{\hat{g}_x^{(p_x)}(k), \hat{g}_y^{(1)}(k), \hat{q}_y(k)\}$ of a spatial factor $\{g_x^{(p_x)}(k), g_y^{(1)}(k), q_y(k)\}$; then, extracting a two-dimensional direction of arrival estimate result $(\hat{\theta}_k, \hat{\varphi}_k)$ from the estimated value $\{\hat{g}_x^{(p_x)}(k), \hat{g}_y^{(1)}(k), \hat{q}_y(k)\}$ of the spatial factor.

The method for estimating direction of arrival of an L-type coprime array based on coupled tensor decomposition, wherein, the structure of the L-type coprime array with the separated sub-arrays in step (1) is specifically described as: the coprime linear array $\mathbb{L}_i$ constituting the L-type coprime array is composed of a pair of sparse uniform linear sub-arrays, the two sparse uniform linear sub-arrays respectively contain $2M_{\mathbb{L}_i}$ and $N_{\mathbb{L}_i}$ antenna elements, and the distances between the array elements are respectively $N_{\mathbb{L}_i}d$ and $M_{\mathbb{L}_i}d$, wherein $M_{\mathbb{L}_i}$ and $N_{\mathbb{L}_i}$ are one pair of coprime integers; a sub-array combination is performed on the two sparse uniform linear sub-arrays in $\mathbb{L}_i$ by overlapping the first array elements to obtain a coprime linear array $\mathbb{L}_i$ containing $|\mathbb{L}_i| = 2M_{\mathbb{L}_i} + N_{\mathbb{L}_i} - 1$ array elements.

The method for estimating direction of arrival of an L-type coprime array based on coupled tensor decomposition, wherein, in the derivation of the fourth-order statistic described in step (2), in practice, the fourth-order covariance tensor $\mathcal{R} \in \mathbb{C}^{|\mathbb{L}_1| \times |\mathbb{L}_2| \times |\mathbb{L}_1| \times |\mathbb{L}_2|}$ based on sampling is obtained by calculating fourth-order statistics of the received signals $x_{\mathbb{L}_1}$ and $x_{\mathbb{L}_2}$ of the T sampling snapshots:

$$\hat{\mathcal{R}} = \left(\frac{1}{T} X_{\mathbb{L}_1} X_{\mathbb{L}_2}^H\right) \circ \left(\frac{1}{T} X_{\mathbb{L}_1} X_{\mathbb{L}_2}^H\right)^*.$$

The method for estimating direction of arrival of an L-type coprime array based on coupled tensor decomposition, wherein, in the construction of the coupled virtual domain tensors described in step (5), the obtained $P_x$ virtual domain tensors $\mathcal{U}_{(p_x)}$ represent the same spatial information in a second dimension and a third dimension and different spatial information in a first dimension, the $P_x$ virtual domain tensors $\mathcal{U}_{(p_x)}$ have a coupling relationship in the second dimension and the third dimension, the first dimension represents angle information of the virtual uniform linear sub-arrays $\mathbb{G}_x^{(p_x)}$, the second dimension represents angle information of the translation window $\mathbb{G}_y^{(1)}$, and the third dimension represents translation information in the y axis direction.

The method for estimating direction of arrival of an L-type coprime array based on coupled tensor decomposition, wherein, in the construction process of the coupled virtual domain tensors described in step (5), the coupled virtual domain tensors are constructed by superimposing translational virtual domain signals in the x-axis direction, specifically comprising: for $P_x$ virtual uniform sub-arrays $\widetilde{\mathbb{G}}_{(:, p_y)}$ with the same subscript $p_y$ covering the same angle information in the y-axis direction and having a spatial translation relationship in the x axis direction, superimposing virtual domain signals $U_{\widetilde{\mathbb{G}}(:, p_y)}$ corresponding thereto in the third dimension, so as to get $P_y$ virtual domain tensors $\mathcal{U}_{(p_y)} \in \mathbb{C}^{|\mathbb{G}_x^{(1)}| \times |\mathbb{G}_y^{(p_y)}| \times P_x}$:

$$\mathcal{U}_{(p_y)} = \left[ U_{\widetilde{\mathbb{G}}(1,p_y)}, U_{\widetilde{\mathbb{G}}(2,p_y)}, \ldots, U_{\widetilde{\mathbb{G}}(p_x,p_y)} \right]_{\sqcup_3} =$$

$$\sum_{k=1}^{K} \sigma_k^4 g_x^{(1)}(k) \circ g_y^{(p_y)}(k) \circ q_x(k) = \left[\!\left[ \sigma_k^4; G_x^{(1)}, G_y^{(p_y)}, Q_x \right]\!\right],$$

wherein, $g_x^{(1)}(k)$ is a steering vector of the translation window $\mathbb{G}_x^{(1)}$, $q_x(k) = [1, e^{j\pi\mu_1(k)}, \ldots, e^{j\pi(P_x-1)\mu_1(k)}]^T$ represents a translation factor along the x axis direction, $G_x^{(1)} = [g_x^{(1)}(1), g_x^{(1)}(2), \ldots, g_x^{(1)}(K)] \cdot G_y^{(p_y)} = [g_y^{(p_y)}(1), g_y^{(p_y)}(2), \ldots, g_y^{(p_y)}(K)]$ and $Q_x = [q_x(1), q_x(2), \ldots, q_x(K)]$ are factor matrices of $\mathcal{U}_{(p_y)}$; the $P_y$ constructed three-dimensional virtual domain tensors $\mathcal{U}_{(p_y)}$ represent the same spatial information in the first and third dimensions and different spatial information in the second dimension, thus the virtual domain tensors $\mathcal{U}_{(p_y)}$ have a coupling relationship in the first and the third dimensions; the constructed $P_y$ three-dimensional virtual domain tensors $\mathcal{U}_{(p_y)}$ are decomposed by coupled canonical polyadic, and factor matrices $\{G_x^{(1)}, G_y^{(p_y)}, Q_x\}$ thereof are estimated, wherein the first dimension represents the angle information of the translation window $\mathbb{G}_x^{(1)}$, the second dimension represents the angle information of the virtual uniform linear sub-arrays $\mathbb{G}_y^{(p_y)}$, and the third dimension represents the translation information in the x-axis direction.

The method for estimating direction of arrival of an L-type coprime array based on coupled tensor decomposition, wherein, in the decomposition of the coupled virtual domain tensors in step (6), the coupling relationship of the constructed $P_x$ three-dimensional virtual domain tensors $\mathcal{U}_{(p_x)}$ is utilized, the coupled canonical polyadic decomposition is performed on $\mathcal{U}_{(p_x)}$ via a joint least-squares optimization problem:

$$\left\{ \hat{G}_x^{(p_x)}, \hat{G}_y^{(1)}, \hat{Q}_y \right\} = \min_{\hat{G}_x^{(p_x)}, \hat{G}_y^{(1)}, \hat{Q}_y} \sum_{p_x} \left\| \mathcal{U}_{(p_x)} - \left[\!\left[ \hat{G}_x^{(p_x)}, \hat{G}_y^{(1)}, \hat{Q}_y \right]\!\right] \right\|_F^2,$$

wherein, $\|\cdot\|_F$ represents the Frobenius norm; solving the joint least squares optimization problem to obtain the estimated value $\{\hat{G}_x^{(p_x)}, \hat{G}_y^{(1)}, \hat{Q}_y\}$ of the factor matrices $\{G_x^{(p_x)}, G_y^{(1)}, Q_y\}$; in the coupled virtual domain tensor decomposition problem, the maximum number of identifiable targets K is $|\mathbb{G}_x^{(p_x)}|+P_y-2$, which exceeds the actual number of the physical array elements of the constructed L-type coprime array with separated sub-array.

The method for estimating direction of arrival of an L-type coprime array based on coupled tensor decomposition, wherein, in step (6), for the estimated space factor $\{\hat{g}_x^{(p_x)}(k), \hat{g}_y^{(1)}(k), \hat{q}_y(k)\}$, the parameters $\hat{\mu}_1(k)$ and $\hat{\mu}_2(k)$ are extracted therefrom:

$$\hat{\mu}_1(k) = \left(\sum_{p_x} v_{(p_x)}^\dagger \angle(\hat{g}_x^{(p_x)}(k))/\pi\right)/P_x,$$

$$\hat{\mu}_2(k) = (w_{(1)}^\dagger \angle(\hat{g}_y^{(1)}(k))/\pi + z^\dagger \angle(\hat{q}_y(k))/\pi)/2,$$

wherein, $v_{(p_x)}=[2-p_x, 3-p_x, \ldots, q_{\mathbb{G}_x}^{(|\mathbb{G}_x|)}+1-p_x]^T$ is a position index of each virtual array element in $\mathbb{G}_x^{(p_x)}$, $w_{(1)}=[1, 2, \ldots, q_{\mathbb{G}_y}^{(|\mathbb{G}_y|)}]^T$ is a position index of each virtual array element in $\mathbb{G}_y^{(1)}$, $z=[0, 1, \ldots, P_y-1]^T$ represents a translation step, $\angle(\cdot)$ represents a complex argument taking operation, $(\cdot)^\dagger$ represents a pseudo-inverse operation; finally, according to the relationship of $\{\mu_1(k), \mu_2(k)\}$ and the two-dimensional direction of arrival $(\theta_k, \varphi_k)$, that is, $\mu_1(k)=\sin(\varphi_k)\cos(\theta_k)$ and $\mu_2(k)=\sin(\varphi_k)\sin(\theta_k)$, a closed-form solution of the two-dimensional direction of arrival estimation $(\hat{\theta}_k, \hat{\varphi}_k)$ is obtained as:

$$\hat{\theta}_k = \arctan\left(\frac{\hat{\mu}_2(k)}{\hat{\mu}_1(k)}\right),$$

$$\hat{\varphi}_k = \sqrt{\hat{\mu}_1(k)^2 + \hat{\mu}_2(k)^2}.$$

Compared with the prior art, the present invention has the following advantages:

(1) The present invention represents the actual received signal of the L-type coprime array by the tensors, and on the basis of tensorized signal modeling, explores the derivation form of the multi-dimensional virtual domain signal, and fully retains and utilizes the original structural information of the received signal;

(2) The present invention, based on the translation augmentation of the multi-dimensional virtual domain signal, structurally derives a plurality of virtual domain tensors with spatial correlation properties, which provides a technical premise for fully utilizing the correlation information of virtual domain signals to realize the direction of arrival estimation;

(3) The present invention proposes a coupling processing method for multiple virtual domain tensors, and designs a coupled virtual domain tensor decomposition optimization method based on joint least squares. Under the premise of fully considering the spatial correlation properties of the virtual domain tensors, the accurate joint estimation of the two-dimensional direction of arrival is realized.

DESCRIPTION OF THE EMBODIMENTS

The technical solutions of the present invention will be described in further detail below with reference to the accompanying drawings.

Figure 1:
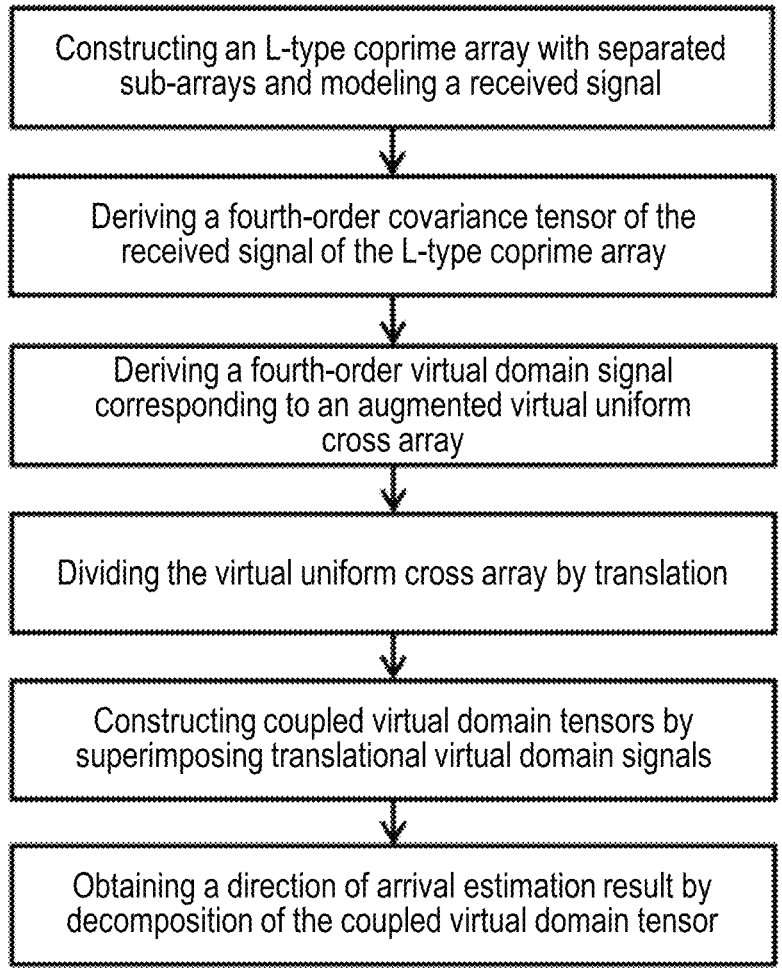
FIG. 1 is a general flow block diagram of the present invention.
Figure 2:
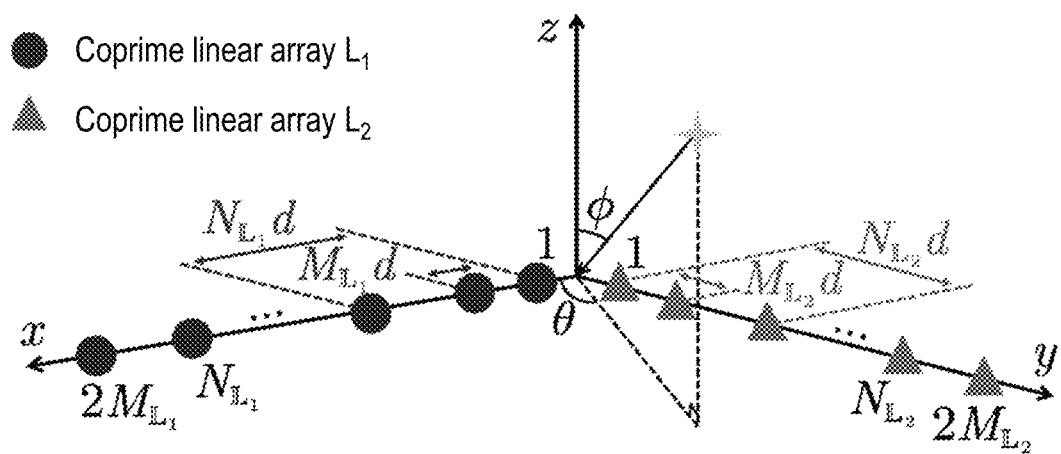
FIG. 2 is a schematic structural diagram of an L-type coprime array with separated sub-arrays proposed by the present invention.

In order to solve the problems of multi-dimensional signal structure damage and virtual domain signal correlation information loss existing in the existing methods, the present invention proposes a method for estimating direction of arrival of an L-type coprime array based on coupled tensor decomposition. By deriving a virtual domain signal of the L-type coprime array based on a tensor model, and constructing a coupling idea of the virtual domain tensors, high-precision two-dimensional direction of arrival estimation can be realized by using the correlation information of the virtual domain tensors. Referring to FIG. 1, the implementation steps of the present invention are as follows:

Step 1: constructing an L-type coprime array with separated sub-arrays and modeling a received signal. At a receiving end, using $2M_{\mathbb{L}_1}+N_{\mathbb{L}_1}+2M_{\mathbb{L}_2}+N_{\mathbb{L}_2}-2$ physical antenna elements to construct the L-type coprime array with the separated sub-arrays, as shown in FIG. 2: constructing coprime linear arrays $\mathbb{L}_i$, i=1, 2 on the x-axis and y-axis respectively; $\mathbb{L}_i$ contains $|\mathbb{L}_i|=2M_{\mathbb{L}_i}+N_{\mathbb{L}_i}-1$ antenna array elements, wherein, $M_{\mathbb{L}_i}$ and $N_{\mathbb{L}_i}$ are a pair of coprime integers, $|\cdot|$ represents a potential of the set; the first array elements of the two coprime linear arrays $\mathbb{L}_1$ and $\mathbb{L}_2$ are laid out from (1, 0) and (1, 0) positions in the xoy coordinate system respectively, so the two coprime linear arrays $\mathbb{L}_1$ and $\mathbb{L}_2$ forming the L-type coprime array do not overlap each other; using $\{(x_{\mathbb{L}_1}, 0)| x_{\mathbb{L}_1}=[q_{\mathbb{L}_1}^{(1)}, q_{\mathbb{L}_1}^{(2)}, \ldots, q_{\mathbb{L}_1}^{(|\mathbb{L}_1|)}]d\}$ and $\{(0, y_{\mathbb{L}_2})| y_{\mathbb{L}_2}=[q_{\mathbb{L}_2}^{(1)}, q_{\mathbb{L}_2}^{(2)}, \ldots, q_{\mathbb{L}_2}^{(|\mathbb{L}_2|)}]d\}$ to represent the positions of all array element of the L-type coprime array on the x-axis and y-axis respectively, wherein $q_{\mathbb{L}_1}^{(1)}=q_{\mathbb{L}_2}^{(1)}=1$, and the unit interval d is taken as half of the wavelength of an incident narrowband signal; the coprime linear array $\mathbb{L}_i$ forming the L-type coprime array is consisted of a pair of sparse uniform linear sub-arrays. The two sparse uniform linear sub-arrays respectively contain $2M_{\mathbb{L}_i}$ and $N_{\mathbb{L}_i}$ antenna elements, and the spacings of the array elements are respectively $N_{\mathbb{L}_i}d$ and $M_{\mathbb{L}_i}d$; the two sparse uniform linear sub-arrays in $\mathbb{L}_i$ are combined with sub-arrays in a way that the first array elements overlap to obtain the coprime linear arrays $\mathbb{L}_i$ containing $2M_{\mathbb{L}_i}+N_{\mathbb{L}_i}-1$ array elements.

assuming that there are K far-field narrow-band incoherent signal sources from $\{(\theta_1, \varphi_1), (\theta_2, \varphi_2), \ldots, (\theta_K, \varphi_K)\}$ directions, modeling a received signals of the two coprime linear arrays $\mathbb{L}_1$ and $\mathbb{L}_2$ forming the L-type coprime array as:

$$X_{\mathbb{L}_i} = \sum_{k=1}^{K} a_{\mathbb{L}_i}(k) \circ s_k + N_{\mathbb{L}_i} \in \mathbb{C}^{|\mathbb{L}_i| \times T},$$

wherein, $s_k = [s_{k,1}, s_{k,2}, \ldots, s_{k,T}]^T$ is a multi-snapshot sampling signal waveform corresponding to a kth incident signal source, T is the number of sampling snapshots, $\circ$ represents an outer product of the vector, $N_{\mathbb{L}_i}$ is a noise independent of each signal source, $a_{\mathbb{L}_i}(k)$ is a steering vector of $\mathbb{L}_i$, and corresponds to a signal source with an incoming wave direction being $(\theta_k, \varphi_k)$, and is expressed as:

$$a_{\mathbb{L}_i}(k) = \left[e^{-j\pi q_{\mathbb{L}_i}^{(1)} \mu_i(k)}, e^{-j\pi q_{\mathbb{L}_i}^{(2)} \mu_i(k)}, \ldots, e^{-j\pi q_{\mathbb{L}_i}^{(|\mathbb{L}_i|)} \mu_i(k)}\right]^T,$$

wherein $\mu_1(k) = \sin(\varphi_k)\cos(\theta_k)$, $\mu_2(k) = \sin(\varphi_k)\sin(\theta_k)$, $j = \sqrt{-1}$, $[\cdot]^T$ represents a transpose operation;

Step 2: deriving a fourth-order covariance tensor of the received signal of the L-type coprime array. A second-order cross-correlation matrix $\mathbb{C}^{|\mathbb{L}_1| \times |\mathbb{L}_2| \times |\mathbb{L}_1| \times |\mathbb{L}_2|} \in \mathbb{C}^{|\mathbb{L}_1| \times |\mathbb{L}_2|}$ is obtained by calculating a cross-correlation statistic of the sampled signal $X_{\mathbb{L}_1}$ and $X_{\mathbb{L}_2}$ of the coprime linear arrays $\mathbb{L}_1$ and $\mathbb{L}_2$:

$$R_{\mathbb{L}_1 \mathbb{L}_2} = E\{X_{\mathbb{L}_1} X_{\mathbb{L}_2}^H\} = \sum_{k=1}^{K} \sigma_k^2 a_{\mathbb{L}_1}(k) \circ a_{\mathbb{L}_2}^*(k)$$

Wherein, $\sigma_k^2 = E\{s_k(t)s_k^*(t)\}$ represents the power of a kth incident signal source. $E\{\cdot\}$ represents a mathematical expectation operation. $(\cdot)^H$ represents a conjugate transpose operation, $(\cdot)^*$ represents a conjugate operation; by calculating the cross-correlation matrix of the received signal, the influence of the noise part $N_{\mathbb{L}_i}$ in the original received signal is effectively eliminated. In order to realize the derivation of augmented virtual array, based on the second-order cross-correlation statistics, the fourth-order statistics of the L-type coprime array are further derived. Calculating the auto-correlation of the second-order cross-correlation matrix $\mathbb{C}^{|\mathbb{L}_1| \times |\mathbb{L}_2| \times |\mathbb{L}_1| \times |\mathbb{L}_2|}$ to obtain the fourth-order covariance tensor $\mathcal{R} \in \mathbb{C}^{|\mathbb{L}_1| \times |\mathbb{L}_2| \times |\mathbb{L}_1| \times |\mathbb{L}_2|}$:

$$\mathcal{R} = R_{\mathbb{L}_1 \mathbb{L}_2} \circ R_{\mathbb{L}_1 \mathbb{L}_2}^* =$$

$$E\{(X_{\mathbb{L}_1} X_{\mathbb{L}_2}^H) \circ (X_{\mathbb{L}_1} X_{\mathbb{L}_2}^H)^*\} = \sum_{k=1}^{K} \sigma_k^4 a_{\mathbb{L}_1}(k) \circ a_{\mathbb{L}_2}^*(k) \circ a_{\mathbb{L}_1}^*(k) \circ a_{\mathbb{L}_2}(k).$$

In practice, based on sampled fourth-order covariance tensor $\mathcal{R} \in \mathbb{C}^{|\mathbb{L}_1| \times |\mathbb{L}_2| \times |\mathbb{L}_1| \times |\mathbb{L}_2|}$, by calculating the fourth-order statistic of the received signals $X_{\mathbb{L}_1}$ and $X_{\mathbb{L}_2}$, we can obtain:

$$\hat{\mathcal{R}} = \left(\frac{1}{T} X_{\mathbb{L}_1} X_{\mathbb{L}_2}^H\right) \circ \left(\frac{1}{T} X_{\mathbb{L}_1} X_{\mathbb{L}_2}^H\right)^*;$$

Step 3: deriving a fourth-order virtual domain signal corresponding to an augmented virtual uniform cross array. By combining the dimensions in the fourth-order covariance tensor $\mathcal{R}$ that characterize spatial information in the same direction, the conjugate steering vectors $\{a_{\mathbb{L}_1}(k), a_{\mathbb{L}_1}^*(k)\}$ and $\{a_{\mathbb{L}_2}(k), a_{\mathbb{L}_2}^*(k)\}$ corresponding to the two coprime linear arrays $\mathbb{L}_1$ and $\mathbb{L}_2$ can form a difference set array on the exponential term, so that a non-continuous augmented virtual linear array is constructed on the x-axis and y-axis respectively, and a two-dimensional non-continuous virtual cross array $\mathbb{V}$ is correspondingly obtained. Specifically, the first and third dimensions of the fourth-order covariance tensor $\mathcal{R}$ represent the spatial information in the x axial direction, and the second and fourth dimensions represent the spatial information in the y axial direction; for this purpose, dimension sets $\mathbb{J}_1 = \{1, 3\}$, $\mathbb{J}_2 = \{2, 4\}$ are defined, and a fourth-order virtual domain signal $V_{\mathbb{V}} \in \mathbb{C}^{|\mathbb{L}_1|^2 \times |\mathbb{L}_2|^2}$ corresponding to the non-continuous virtual cross array $\mathbb{V}$ is obtained by performing dimension-merging tensor transformation on the fourth-order covariance tensor $\mathcal{R}$:

$$V_{\mathbb{V}} \triangleq \mathcal{R}_{\{\mathbb{J}_1, \mathbb{J}_2\}} = \sum_{k=1}^{K} \sigma_k^4 [a_{\mathbb{L}_1}^*(k) \otimes a_{\mathbb{L}_1}(k)] \circ [a_{\mathbb{L}_2}(k) \otimes a_{\mathbb{L}_2}^*(k)],$$

wherein, by forming a difference set array on an exponential term, $a_{\mathbb{L}_1}^*(k) \otimes a_{\mathbb{L}_1}(k)$ and $a_{\mathbb{L}_2}(k) \otimes a_{\mathbb{L}_2}^*(k)$ each constructs an augmented virtual linear array on the x axis and y axis, $\otimes$ represents a Kronecker product.

Figure 3:
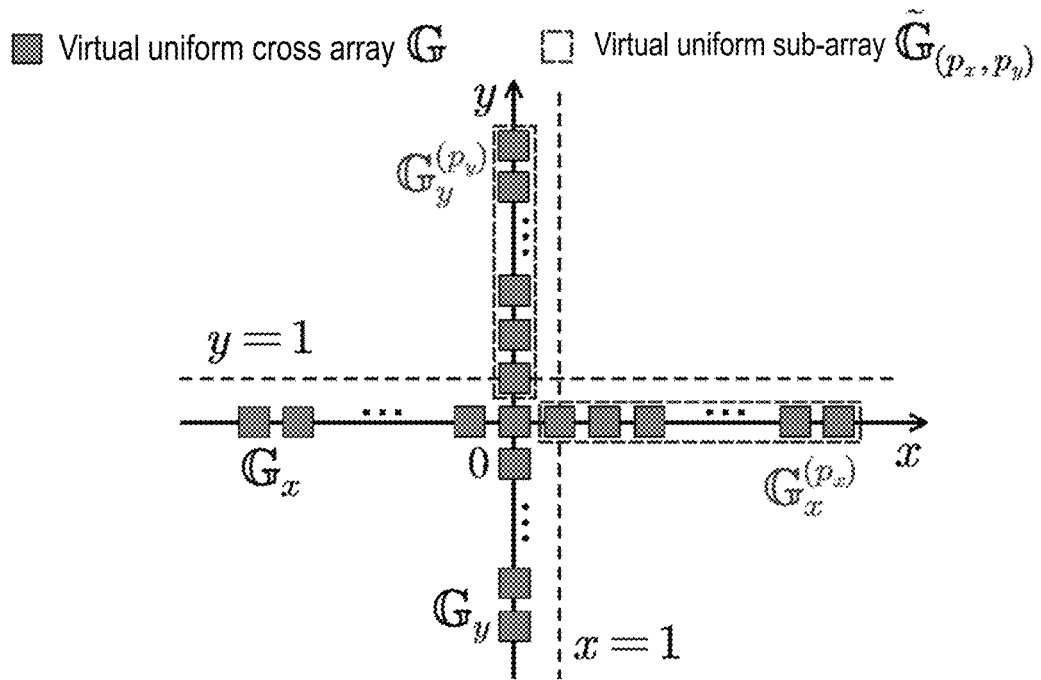
FIG. 3 is a schematic diagram of a virtual uniform cross array and a virtual uniform sub-array constructed by the present invention.

$\mathbb{V}$ contains a virtual uniform cross array $\mathbb{G} = \mathbb{G}_x \cup \mathbb{G}_y$, as shown in FIG. 3, wherein $\mathbb{G}_x$ and $\mathbb{G}_y$ are the virtual uniform linear arrays on the x axis and on the y axis, respectively. Positions in all virtual array elements in $\mathbb{G}_x$ and $\mathbb{G}_y$ are respectively denoted as $\mathbb{G}_x = \{(\mathbb{C}^{|\mathbb{G}_x| \times |\mathbb{G}_y|}, 0) | \mathbb{C}^{|\mathbb{G}_x| \times |\mathbb{G}_y|} = [q_{\mathbb{G}_x}^{(1)}, q_{\mathbb{G}_x}^{(2)}, \ldots, q_{\mathbb{G}_x}^{(|\mathbb{G}_x|)}]d\}$ and $\mathbb{G}_y = \{(0, y\mathbb{G}) | y\mathbb{G} = [q_{\mathbb{G}_y}^{(1)}, q_{\mathbb{G}_y}^{(2)}, \ldots, q_{\mathbb{G}_y}^{(|\mathbb{G}_y|)}]d\}$, wherein $q_{\mathbb{G}_x}^{(1)} = -M_{\mathbb{L}_1} N_{\mathbb{L}_1} - M_{\mathbb{L}_1} + 2$, $q_{\mathbb{G}_x}^{(|\mathbb{G}_x|)} = M_{\mathbb{L}_1} N_{\mathbb{L}_1} + M_{\mathbb{L}_1}$, $q_{\mathbb{G}_y}^{(1)} = -M_{\mathbb{L}_2} N_{\mathbb{L}_2} - M_{\mathbb{L}_2} + 2$, $q_{\mathbb{G}_y}^{(|\mathbb{G}_y|)} = M_{\mathbb{L}_2} N_{\mathbb{L}_2} + M_{\mathbb{L}_2}$, and $|\mathbb{G}_x| = 2(M_{\mathbb{L}_1} N_{\mathbb{L}_1} + M_{\mathbb{L}_1}) - 1$, $|\mathbb{G}_y| = 2(M_{\mathbb{L}_2} N_{\mathbb{L}_2} + M_{\mathbb{L}_2}) - 1$.

extracting an element corresponding to the position of each virtual array element in the virtual uniform cross array G from the virtual domain signal $V_{\mathbb{V}}$ of the non-continuous virtual cross array $\mathbb{V}$, and obtaining a virtual domain signal $\bar{V}_{\mathbb{G}} \in \mathbb{C}^{|\mathbb{G}_x| \times |\mathbb{G}_y|}$ corresponding to $\mathbb{G}$, which is modeled as:

$$\bar{V}_{\mathbb{G}} = \sum_{k=1}^{K} \sigma_k^4 b_x(k) \circ b_y(k),$$

wherein, $$b_x(k) = \left[e^{-j\pi q_{\mathbb{G}_x}^{(1)}\mu_1(k)}, e^{-j\pi q_{\mathbb{G}_x}^{(2)}\mu_1(k)}, \ldots, e^{-j\pi q_{\mathbb{G}_x}^{(|\mathbb{G}_x|)}\mu_1(k)}\right]^T,$$

$$b_y(k) = \left[e^{-j\pi q_{\mathbb{G}_y}^{(1)}\mu_1(k)}, e^{-j\pi q_{\mathbb{G}_y}^{(2)}\mu_1(k)}, \ldots, e^{-j\pi q_{\mathbb{G}_y}^{(|\mathbb{G}_y|)}\mu_1(k)}\right]^T,$$

represent the steering vectors of $\mathbb{G}_x$ and $\mathbb{G}_y$, respectively;

Step 4: dividing the virtual uniform cross array by translation. Considering the two virtual uniform linear arrays $\mathbb{G}_x$ and $\mathbb{G}_y$ that make up the virtual uniform cross array $\mathbb{G}$ are symmetric about the x=1 and y=1 axis, respectively, extracting the sub-arrays $\mathbb{G}_x^{(1)}=\{(x_{\mathbb{G}}^{(1)}, 0)| x_{\mathbb{G}}^{(1)}=[1, 2, \ldots, q_{\mathbb{G}_x}^{(|\mathbb{G}_x|)}]d\}$ and $\mathbb{G}_y^{(1)}=\{(0, y_{\mathbb{G}}^{(1)})| y_{\mathbb{G}}^{(1)}=[1, 2, \ldots, q_{\mathbb{G}_y}^{(|\mathbb{G}_y|)}]d\}$ from $\mathbb{G}_x$ and $\mathbb{G}_y$ as the translation windows; then, translating the translation windows $\mathbb{G}_x^{(1)}$ and $\mathbb{G}_y^{(1)}$ along negative semi-axis directions of the x axis and the y axis by a virtual array element interval one by one to obtain $P_x$ virtual uniform linear sub-arrays $\mathbb{G}_x^{(p_x)}=\{(x_{\mathbb{G}}^{(p_x)}, 0)| x_{\mathbb{G}}^{(p_x)}=[2-p_x, 3-p_x, \ldots, q_{\mathbb{G}_x}^{(|\mathbb{G}_x|)}+1-p_x]d\}$ and $P_y$ virtual uniform linear sub-arrays $\mathbb{G}_y^{(p_y)}=\{(0, y_{\mathbb{G}}^{(p_y)})| y_{\mathbb{G}}^{(p_y)}=[2-p_y, 3-p_y, \ldots, q_{\mathbb{G}_y}^{(|\mathbb{G}_y|)}+1-p_y]d\}$, as shown in FIG. 3, wherein $P_x=(|\mathbb{G}_x|+1)/2$, $P_y=(|\mathbb{G}_y|+1)/2$; then the virtual domain signal of the virtual uniform sub-arrays $\widetilde{\mathbb{G}}_{(p_x,p_y)}=\mathbb{G}_x^{(p_x)} \cup \mathbb{G}_y^{(p_y)}$ can be expressed as:

$$U_{\widetilde{\mathbb{G}}_{(p_x,p_y)}} = \sum_{k=1}^{K} \sigma_k^4 g_x^{(p_x)}(k) \circ g_y^{(p_y)}(k) = \mathbb{C}^{|\mathbb{G}_x^{(p_x)}| \times |\mathbb{G}_y^{(p_y)}|},$$

wherein, $$g_x^{(p_x)}(k) = \left[e^{-j\pi(2-p_x)\mu_1(k)}, e^{-j\pi(3-p_x)\mu_1(k)}, \ldots, e^{-j\pi\left(q_{\mathbb{G}_x}^{(|\mathbb{G}_x|)}+1-p_x\right)\mu_1(k)}\right]^T,$$

$$g_y^{(p_y)}(k) = \left[e^{-j\pi(2-p_y)\mu_2(k)}, e^{-j\pi(3-p_y)\mu_2(k)}, \ldots, e^{-j\pi\left(q_{\mathbb{G}_y}^{(|\mathbb{G}_y|)}+1-p_y\right)\mu_1(k)}\right]^T,$$

are the steering vectors of $\mathbb{G}_x^{(p_x)}$ and $\mathbb{G}_y^{(p_y)}$, respectively;

Step 5: constructing coupled virtual domain tensors by superimposing translational virtual domain signals. Since the virtual uniform sub-arrays $\widetilde{\mathbb{G}}_{(p_x,p_y)}$ obtained by translation division have a spatial translation relationship with each other, the virtual domain signals corresponding to these virtual uniform sub-arrays are structurally superimposed to obtain several virtual domain tensors with a coupling relationship. Specifically, for $P_y$ virtual uniform sub-arrays $\widetilde{\mathbb{G}}_{(p_x,:)}$ with the same subscript $p_x$, they cover the same angle information in the x axial direction, and have a spatial translation relationship in the y axial direction. For this reason, their corresponding virtual domain signals $U_{\widetilde{\mathbb{G}}_{(p_x,:)}}$ are superimposed in the third dimension to obtain $P_x$ three-dimensional coupled virtual domain tensors $\mathcal{U}_{(p_x)} \in \mathbb{C}^{|\mathbb{G}_x^{(p_x)}| \times |\mathbb{G}_y^{(1)}| \times P_y}$:

$$\mathcal{U}_{(p_x)} = \left[U_{\widetilde{\mathbb{G}}_{(p_x,1)}}, U_{\widetilde{\mathbb{G}}_{(p_x,2)}}, \ldots, U_{\widetilde{\mathbb{G}}_{(p_x,P_y)}}\right]_{\sqcup_3} =$$

$$\sum_{k=1}^{K} \sigma_k^4 g_x^{(p_x)}(k) \circ g_y^{(1)}(k) \circ q_y(k) = [\![\sigma_k^4; G_x^{(p_x)}, G_y^{(1)}, Q_y]\!],$$

Wherein, $g_y^{(1)}(k)$ is the steering vector of the translation window $\mathbb{G}_y^{(1)}$, $q_y(k)=[1, e^{j\pi\mu_2(k)}, \ldots, e^{j\pi(P_y-1)\mu_2(k)}]^T$ represents a translation factor along the y axis direction, $G_x^{(p_x)}=[g_x^{(p_x)}(1), g_x^{(p_x)}(2), \ldots, g_x^{(p_x)}(K)]$, $G_y^{(1)}=[g_y^{(1)}(1), g_y^{(1)}(2), \ldots, g_y^{(1)}(K)]$ and $Q_y=[q_y(1), q_y(2), \ldots, q_y(K)]$ are factor matrices of $\mathcal{U}_{(p_x)}$, $[\cdot]_{\sqcup_a}$ represents a tensor superposition operation on the ath dimension, and $[\![\cdot]\!]$ represents a canonical polyadic model of the tensors; the constructed $P_x$ three-dimensional virtual domain tensors $\mathcal{U}_{(p_x)}$ represent the same spatial information in the second dimension (the angle information of the translation window $\mathbb{G}_y^{(1)}$) and the third dimension (the translation information in the y axis direction), and different spatial information in the first dimension (the angle information of the virtual uniform linear sub-arrays $\mathbb{G}_x^{(p_x)}$. For this reason, the virtual domain tensors $\mathcal{U}_{(p_x)}$ have a coupling relationship in the second and third dimensions.

Similarly, coupled virtual domain tensors can be constructed by superimposing the translation virtual domain signals in the x-axis direction. Specifically, for $P_x$ virtual uniform sub-arrays $\widetilde{\mathbb{G}}_{(:,p_y)}$ with the same subscript $p_y$, they cover the same angle information in the axial direction, and have a spatial translation relationship in the x axial direction. Their corresponding virtual domain signals $U_{\widetilde{\mathbb{G}}_{(:,p_y)}}$ may be superimposed in the third dimension to obtain $P_y$ three-dimensional virtual domain tensors $\mathcal{U}_{(p_y)} \in \mathbb{C}^{|\mathbb{G}_x^{(1)}| \times |\mathbb{G}_y^{(p_y)}| \times P_x}$:

$$\mathcal{U}_{(p_x)} = \left[U_{\widetilde{\mathbb{G}}_{(p_x,1)}}, U_{\widetilde{\mathbb{G}}_{(p_x,2)}}, \ldots, U_{\widetilde{\mathbb{G}}_{(p_x,p_y)}}\right]_{\sqcup_3} =$$

$$\sum_{k=1}^{K} \sigma_k^4 g_x^{(p_x)}(k) \circ g_y^{(1)}(k) \circ q_y(k) = [\![\sigma_k^4; G_x^{(p_x)}, G_y^{(1)}, Q_y]\!],$$

Wherein, $g_x^{(1)}(k)$ is a steering vector of the translation window $\mathbb{G}_x^{(1)}$, $q_x(k)=[1, e^{j\pi\mu_1(k)}, \ldots, e^{j\pi(P_x-1)\mu_1(k)}]^T$ represents a translation factor along the x axis direction, $G_x^{(1)}=[g_x^{(1)}(1), g_x^{(1)}(2), \ldots, g_x^{(1)}(K)]$, $G_y^{(p_y)}=[g_y^{(p_y)}(1), g_y^{(p_y)}(2), \ldots, g_y^{(p_y)}(K)]$ and $Q_x=[q_x(1), q_x(2), \ldots, q_x(K)]$ are factor matrices of $\mathcal{U}_{(p_y)}$; the constructed $P_y$ three-dimensional virtual domain tensors $\mathcal{U}_{(p_y)}$ represent the same spatial information in the first dimension (the angle information of the translation window $\mathbb{G}_x^{(1)}$) and the third dimension (the translation information in the x axis direction), and different spatial information in the second dimension (the angle information of the virtual uniform linear sub-arrays $\mathbb{G}_y^{(p_y)}$). For this reason, the virtual domain tensors $\mathcal{U}_{(p_y)}$ have a coupling relationship in the first and third dimensions.

Step 6: obtaining a direction of arrival estimation result by decomposition of the coupled virtual domain tensor. The coupling relationship of the constructed $P_x$ virtual domain tensors $\mathcal{U}_{(p_x)}$ is utilized, the coupled canonical polyadic decomposition is performed on $\mathcal{U}_{(p_x)}$ via a joint least-squares optimization problem:

$$\{\hat{G}_x^{(p_x)}, \hat{G}_y^{(1)}, \hat{Q}_y\} = \min_{\hat{G}_x^{(p_x)}, \hat{G}_y^{(1)}, \hat{Q}_y} \sum_{p_x} \left\| \mathcal{U}_{(p_x)} - [\![\hat{G}_x^{(p_x)}, \hat{G}_y^{(1)}, \hat{Q}_y]\!] \right\|_F^2,$$

Wherein, $\{\hat{G}_x^{(p_x)}, \hat{G}_y^{(1)}, \hat{Q}_y\}$ represents the estimated value of the factor matrices $\{G_x^{(p_x)}, G_y^{(1)}, Q_y\}$, which is composed of the estimated value $\{\hat{g}_x^{(p_x)}(k), \hat{g}_y^{(1)}(k), \hat{q}_y(k)\}$ of a spatial factor $\{g_x^{(p_x)}(k), g_y^{(1)}(k), q_y(k)\}$, and $\|\cdot\|_F$ represents the Frobenius norm; by solving the joint least squares optimization problem, $\{\hat{g}_x^{(p_x)}(k), \hat{g}_y^{(1)}(k), \hat{q}_y(k)\}$ is obtained. In this problem, the maximum number of identifiable targets K is $|\mathbb{G}_x^{(p_x)}|+P_y-2$, which exceeds the actual number of the physical array elements of the constructed L-type coprime array with separated sub-arrays. Similarly, the constructed $P_y$ three-dimensional virtual domain tensors $\mathcal{U}_{(p_y)}$ can be decomposed by coupled canonical polyadic to estimate its factor matrix $\{G_x^{(1)}, G_y^{(p_y)}, Q_x\}$. Extracting parameters $\hat{\mu}_1(k)$ and $\hat{\mu}_2(k)$ from estimated values $\{\hat{g}_x^{(p_x)}(k), \hat{g}_y^{(1)}(k), \hat{q}_y(k)\}$ of spatial factors:

$$\hat{\mu}_1(k) = \left( \sum_{p_x} v_{(p_x)}^\dagger L(\hat{g}_x^{(p_x)}(k))/\pi \right)/P_x,$$

$$\hat{\mu}_2(k) = (w_{(1)}^\dagger L(\hat{g}_y^{(1)}(k))/\pi + z^\dagger L(\hat{q}_y(k))/\pi)/2,$$

wherein, $v_{(p_x)} = [2-p_x, 3-p_x, \ldots, q_{\mathbb{G}_x}^{(|\mathbb{G}_x|)}+1-p_x]^T$ is a position index of each virtual array element in $\mathbb{G}_x^{(p_x)}$, $w_{(1)} = [1, 2, \ldots, q_{\mathbb{G}_y}^{(|\mathbb{G}_y|)}]^T$ represents a position index of each virtual array element in $\mathbb{G}_y^{(1)}$, $z=[0, 1, \ldots, P_y-1]^T$ represents a translation step, $\angle(\cdot)$ represents a complex argument taking operation. $(\cdot)^\dagger$ represents a pseudo-inverse operation. Finally, according to the relationship between $\{\mu_1(k), \mu_2(k)\}$ and the two-dimensional direction of arrival $(\theta_k, \varphi_k)$, namely $\mu_1(k)=\sin(\varphi_k)\cos(\theta_k)$ and $\mu_2(k)=\sin(\varphi_k)\sin(\theta_k)$, a closed-form solution of the two-dimensional direction of arrival estimation $(\hat{\theta}_k, \hat{\varphi}_k)$ is obtained as:

$$\hat{\theta}_k = \arctan\left( \frac{\hat{\mu}_2(k)}{\hat{\mu}_1(k)} \right),$$

$$\hat{\varphi}_k = \sqrt{\hat{\mu}_1(k)^2 + \hat{\mu}_2(k)^2}.$$

The effects of the present invention will be further described below in conjunction with a simulation instance.

Figure 4:
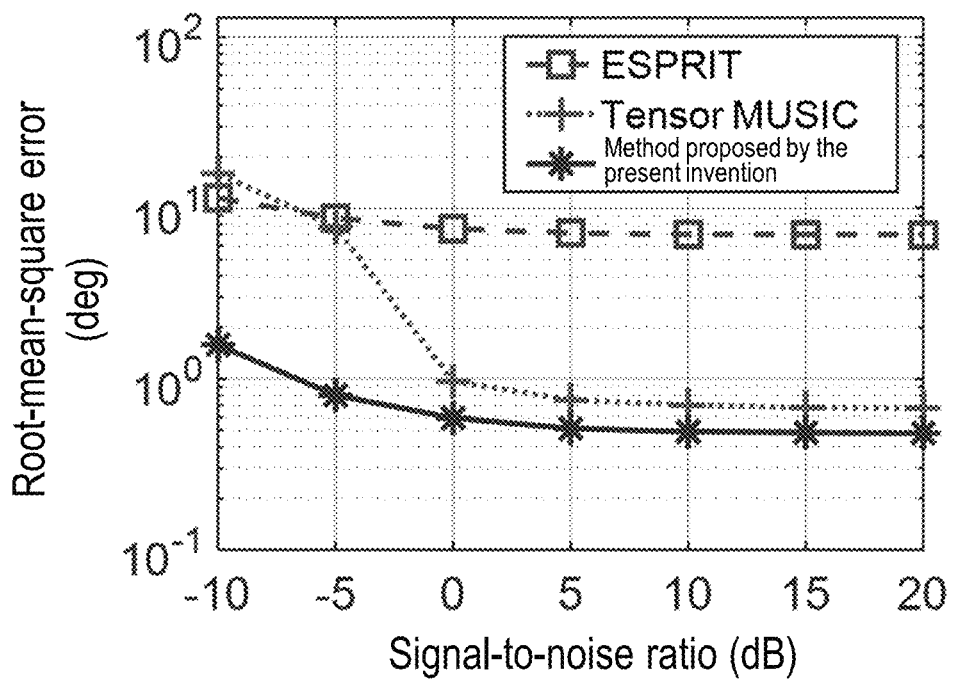
FIG. 4 is a performance comparison diagram of direction of arrival estimation accuracy of the method proposed in the present invention under different signal-to-noise ratio conditions.
Figure 5:
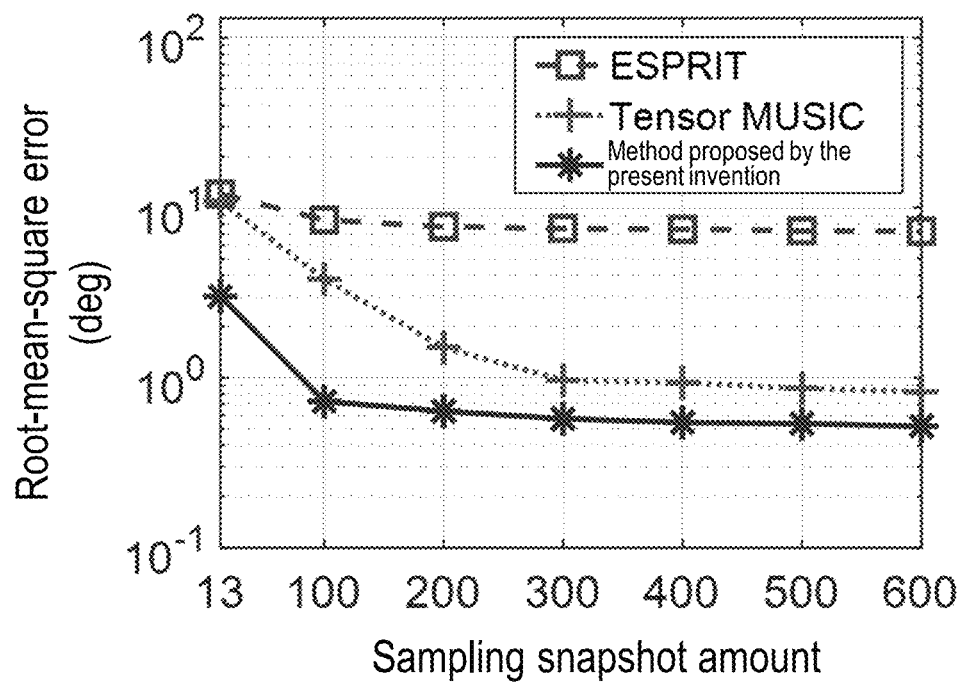
FIG. 5 is a performance comparison diagram of direction of arrival estimation accuracy of the method proposed in the present invention under different sampling snapshot amount conditions.

The simulation instance: The L-type coprime array is used to receive the incident signal, and its parameters are selected as $M_{\mathbb{L}_1}=M_{\mathbb{L}_2}=2$, $N_{\mathbb{L}_1}=N_{\mathbb{L}_2}=3$, that is, the constructed L-type coprime array contains $2M_{\mathbb{L}_1}+N_{\mathbb{L}_1}+2M_{\mathbb{L}_2}+N_{\mathbb{L}_2}-2=12$ antenna elements. Assuming that there are 2 incident narrowband signals, the azimuth and elevation angles of the incident directions are respectively [20.5°, 30.5°] and [45.6°, 40.6°]. The method for estimating direction of arrival of an L-type coprime array based on coupled tensor decomposition and the traditional Estimation of Signal Parameters via Rotational Invariant Techniques (ESPRIT) method based on the vectorized virtual domain signal processing, and the TensorMultipleSignal Classification (Tensor MUSIC) method based on traditional tensor decomposition are compared. FIG. 4 and FIG. 5 respectively compare the performance of the two-dimensional direction of arrival estimation accuracy of the above methods under the conditions of different signal-to-noise ratios and different sampling snapshot amounts.

Under the condition of the number T=300 of sampling snapshots, plotting the performance comparison curve of direction of arrival estimation root-mean-square error as a function of signal-to-noise ratios, as shown in FIG. 4; under the condition of signal-to-noise ratio SNR=0 dB, plotting the performance comparison curve of the root-mean-square error of direction of arrival estimation as a function of the sampling snapshot amounts, as shown in FIG. 5. It can be seen from the comparison results of FIG. 4 and FIG. 5 that the method proposed in the present invention has a performance advantage in the estimation accuracy of direction of arrival no matter in different signal-to-noise ratio scenarios or in different sampling snapshot amount scenarios. Compared with the ESPRIT method based on vectorized virtual domain signal processing, the method proposed in the present invention makes full use of the structural information of the received signal of the L-type coprime array by constructing the virtual domain tensors, thereby having superior direction of arrival estimation accuracy. On the other hand, compared with the TensorMUSIC method based on traditional tensor decomposition, the performance advantage of the method proposed in the present invention comes from making full use of the spatial correlation properties of multi-dimensional virtual domain signals by coupling virtual domain tensor processing, while the traditional tensor decomposition methods only process a single virtual domain tensor after spatial smoothing, resulting in the loss of virtual domain signal correlation information.

To sum up, the present invention constructs the correlation between the multi-dimensional virtual domain of the L-type coprime array and the tensor signal modeling, deduces the sparse tensor signal to the virtual domain tensor model, and deeply excavates the received signal of the L-type coprime array and the multi-dimensional features of the virtual domain; furthermore, the spatial superposition mechanism of the virtual domain signals is established, and the virtual domain tensors with the spatial coupling relationship are constructed without introducing the spatial smoothing; finally, the present invention uses the coupled decomposition of the virtual domain tensors, realizes the accurate estimation of the two-dimensional direction of arrival, and gives its closed-form solution.

The above descriptions are only preferred embodiments of the present invention. Although the present invention has been disclosed above with preferred examples, it is not intended to limit the present invention. Any person skilled in the art, without departing from the scope of the technical solution of the present invention, can make many possible changes and modifications to the technical solution of the present invention by using the methods and technical contents disclosed above, or modify them into equivalent examples of equivalent changes. Therefore, any simple alterations, equivalent changes and modifications made to the above embodiments according to the technical essence of the present invention without departing from the content of the technical solutions of the present invention still fall within the protection scope of the technical solutions of the present invention.

What is claimed is:

1. A method for estimating direction of arrival of an L-type coprime array based on coupled tensor decomposition, wherein the method comprises the following steps:

(1) using $2M_{\mathbb{L}_1}+N_{\mathbb{L}_1}+2M_{\mathbb{L}_2}+N_{\mathbb{L}_2}-2$ physical antenna array elements by a receiving end to construct the L-type coprime array with separated sub-arrays, wherein the L-type coprime array consists of two coprime linear arrays $\mathbb{L}_i$, i=1, 2 located on the x-axis and the y-axis, wherein the first array elements of the two coprime linear arrays $\mathbb{L}_1$ and $\mathbb{L}_2$ are laid out from positions (1, 0) and (1, 0) in an xoy coordinate system respectively; the coprime linear array $\mathbb{L}_i$ contains $|\mathbb{L}_i|=2M_{\mathbb{L}_i}+N_{\mathbb{L}_i}-1$ array elements, wherein, $M_{\mathbb{L}_i}$ and $N_{\mathbb{L}_i}$ are a pair of coprime integers, $|\cdot|$ represents the potential of the set; $\{(x_{\mathbb{L}_1}, 0) | x_{\mathbb{L}_1}=[q_{\mathbb{L}_1}^{(1)}, q_{\mathbb{L}_1}^{(2)}, \ldots, q_{\mathbb{L}_1}^{(|\mathbb{L}_1|)}]d\}$ and $\{(0, y_{\mathbb{L}_2}) | y_{\mathbb{L}_2}=[q_{\mathbb{L}_2}^{(1)}, q_{\mathbb{L}_2}^{(2)}, \ldots, q_{\mathbb{L}_2}^{(|\mathbb{L}_2|)}]d\}$ are respectively used to represent the positions of each array element in the L-type coprime array on the x-axis and y-axis, wherein, $q_{\mathbb{L}_1}^{(1)}=q_{\mathbb{L}_2}^{(1)}=1$, the unit interval d is taken as a half of the wavelength of incident narrowband signal;

assuming that there are K far-field narrow-band incoherent signal sources from $\{(\theta_1, \varphi_1), (\theta_2, \varphi_2), \ldots, (\theta_K, \varphi_K)\}$ directions, modeling a received signal of the coprime linear array $\mathbb{L}_i$ forming the L-type coprime array as:

$$X_{\mathbb{L}_i} = \sum_{k=1}^{K} a_{\mathbb{L}_i}(k) \circ s_k + N_{\mathbb{L}_i} \in \mathbb{C}^{|\mathbb{L}_i| \times T},$$

wherein, $s_k=[s_{k,1}, s_{k,2}, \ldots, s_{k,T}]^T$ is a multi-snapshot sampling signal waveform corresponding to a kth incident signal source, T is the number of sampling snapshots, $\circ$ represents an outer product of the vector, $N_{\mathbb{L}_i}$ is a noise independent of each signal source, $a_{\mathbb{L}_i}(k)$ is a steering vector of $\mathbb{L}_i$, and corresponds to a signal source with an incoming wave direction being $(\theta_k, \varphi_k)$, and is expressed as:

$$a_{\mathbb{L}_i}(k) = \left[e^{-j\pi q_{\mathbb{L}_i}^{(1)}\mu_i(k)}, e^{-j\pi q_{\mathbb{L}_i}^{(2)}\mu_i(k)}, \ldots, e^{-j\pi q_{\mathbb{L}_i}^{(|\mathbb{L}_i|)}\mu_i(k)}\right]^T,$$

wherein $\mu_1(k)=\sin(\varphi_k)\cos(\theta_k)$, $\mu_2(k)=\sin(\varphi_k)\sin(\theta_k)$, $j=\sqrt{-1}$, $[\cdot]^T$ represents a transpose operation;

(2) by solving cross-correlation statistics of $X_{\mathbb{L}_1}$ and $X_{\mathbb{L}_2}$, obtaining a second-order cross-correlation matrix $\mathbb{C}^{|\mathbb{L}_1| \times |\mathbb{L}_2| \times |\mathbb{L}_1| \times |\mathbb{L}_2|} \in \mathbb{C}^{|\mathbb{L}_1| \times |\mathbb{L}_2|}$;

$$R_{\mathbb{L}_1\mathbb{L}_2} = E\{X_{\mathbb{L}_1} X_{\mathbb{L}_2}^H\} = \sum_{k=1}^{K} \sigma_k^2 a_{\mathbb{L}_1}(k) \circ a_{\mathbb{L}_2}^*(k),$$

wherein, $\sigma_k^2=E\{s_k(t)s^*_k(t)\}$ represents the power of the kth incident signal source, $E\{\cdot\}$ represents a mathematical expectation operation, $(\cdot)^H$ represents a conjugate transpose operation, $(\cdot)^*$ represents a conjugate operation, and on the basis of the second-order cross-correlation matrix, fourth-order statistic of the L-type coprime array with the separated sub-arrays is derived, that is, a fourth-order covariance tensor $\mathcal{R} \in \mathbb{C}^{|\mathbb{L}_1| \times |\mathbb{L}_2| \times |\mathbb{L}_1| \times |\mathbb{L}_2|}$ is obtained by calculating the auto-correlation of the second-order cross-correlation matrix $R_{\mathbb{L}_1\mathbb{L}_2}$:

$$\mathcal{R} = R_{\mathbb{L}_1\mathbb{L}_2} \circ R_{\mathbb{L}_1\mathbb{L}_2}^* =$$

$$E\{(X_{\mathbb{L}_1} X_{\mathbb{L}_2}^H) \circ (X_{\mathbb{L}_1} X_{\mathbb{L}_2}^H)^*\} = \sum_{k=1}^{K} \sigma_k^4 a_{\mathbb{L}_1}(k) \circ a_{\mathbb{L}_2}^*(k) \circ a_{\mathbb{L}_1}^*(k) \circ a_{\mathbb{L}_2}(k);$$

(3) defining dimension sets $\mathbb{J}_1=\{1, 3\}$, $\mathbb{J}_2=\{2, 4\}$ and obtaining a fourth-order virtual domain signal $V_\mathbb{V} \in \mathbb{C}^{|\mathbb{L}_1|^2 \times |\mathbb{L}_2|^2}$ by performing a tensor transformation of dimension merging on the fourth-order covariance tensor $\mathcal{R}$:

$$V_\mathbb{V} \triangleq \mathcal{R}_{\{\mathbb{J}_1, \mathbb{J}_2\}} = \sum_{k=1}^{K} \sigma_k^4 [a_{\mathbb{L}_1}^*(k) \otimes a_{\mathbb{L}_1}(k)] \circ [a_{\mathbb{L}_1}(k) \otimes a_{\mathbb{L}_2}^*(k)],$$

wherein, by forming a difference set array on an exponential term, $a_{\mathbb{L}_1}^*(k) \otimes a_{\mathbb{L}_1}(k)$ and $a_{\mathbb{L}_2}(k) \otimes a_{\mathbb{L}_2}^*(k)$ each constructs an augmented non-continuous virtual linear array on the x axis and y axis, $\otimes$ represents a Kronecker product, $V_\mathbb{V}$ corresponds to a two-dimensional non-continuous virtual cross array $\mathbb{V}$, $\mathbb{V}$ contains a virtual uniform cross array $\mathbb{G} = \mathbb{G}_x \cup \mathbb{G}_y$, wherein $\mathbb{G}_x$ and $\mathbb{G}_y$ are each a virtual uniform linear array on the x axis and y axis; the positions of all virtual array elements in the $\mathbb{G}_x$ and $\mathbb{G}_y$ are expressed as $\mathbb{G}_x=\{\mathbb{C}^{|\mathbb{G}_x| \times |\mathbb{G}_y|}, 0)|\mathbb{C}^{|\mathbb{G}_x| \times |\mathbb{G}_y|}=[q_{\mathbb{G}_x}^{(1)}, q_{\mathbb{G}_x}^{(2)}, \ldots, q_{\mathbb{G}_x}^{(|\mathbb{G}_x|)}]d\}$ and $\mathbb{G}_y=\{(0, y_\mathbb{G})| y_\mathbb{G}=[q_{\mathbb{G}_y}^{(1)}, q_{\mathbb{G}_y}^{(2)}, \ldots, q_{\mathbb{G}_y}^{(|\mathbb{G}_y|)}]d\}$, wherein $q_{\mathbb{G}_x}^{(1)}=-M_{\mathbb{L}_1}N_{\mathbb{L}_1}-M_{\mathbb{L}_1}+2$, $q_{\mathbb{G}_x}^{(|\mathbb{G}_x|)}=M_{\mathbb{L}_1}N_{\mathbb{L}_1}+M_{\mathbb{L}_1}$, $q_{\mathbb{G}_y}^{(1)}=-M_{\mathbb{L}_2}N_{\mathbb{L}_2}-M_{\mathbb{L}_2}+2$, $q_{\mathbb{G}_y}^{(|\mathbb{G}_y|)}=M_{\mathbb{L}_2}N_{\mathbb{L}_2}+M_{\mathbb{L}_2}$, and $|\mathbb{G}_x|=2(M_{\mathbb{L}_1}N_{\mathbb{L}_1}+M_{\mathbb{L}_1})-1$, $|\mathbb{G}_y|=2(M_{\mathbb{L}_2}N_{\mathbb{L}_2}+M_{\mathbb{L}_2})-1$;

extracting an element corresponding to the position of each virtual array element in the virtual uniform cross array $\mathbb{G}$ from the virtual domain signal $V_\mathbb{V}$ of the non-continuous virtual cross array $\mathbb{V}$, and obtaining a virtual domain signal $\overline{V}_\mathbb{G} \in \mathbb{C}^{|\mathbb{G}_x| \times |\mathbb{G}_y|}$ corresponding to $\mathbb{G}$, which is modeled as:

$$\overline{V}_\mathbb{G} = \sum_{k=1}^{K} \sigma_k^4 b_x(k) \circ b_y(k),$$

wherein, $$b_x(k) = \left[e^{-j\pi q_{\mathbb{G}_x}^{(1)}\mu_1(k)}, e^{-j\pi q_{\mathbb{G}_x}^{(2)}\mu_1(k)}, \ldots, e^{-j\pi q_{\mathbb{G}_x}^{(|\mathbb{G}_x|)}\mu_1(k)}\right]^T,$$

-continued $$b_y(k) = \left[e^{-j\pi q_{\mathbb{G}_y}^{(1)}\mu_2(k)}, e^{-j\pi q_{\mathbb{G}_y}^{(2)}\mu_2(k)}, \ldots, e^{-j\pi q_{\mathbb{G}_y}^{(|\mathbb{G}_y|)}\mu_2(k)}\right]^T,$$

are steering vectors of $\mathbb{G}_x$ and $\mathbb{G}_y$, respectively;

(4) respectively extracting sub-arrays $\mathbb{G}_x^{(1)} = \{(x_{\mathbb{G}}^{(1)}, 0) | x_{\mathbb{G}}^{(1)} = [1, 2, \ldots, q_{\mathbb{G}_x}^{(|\mathbb{G}_x|)}]d\}$, $\mathbb{G}_y^{(1)} = \{(0, y_{\mathbb{G}}^{(1)}) | y_{\mathbb{G}}^{(1)} = [1, 2, \ldots, q_{\mathbb{G}_y}^{(|\mathbb{G}_y|)}]d\}$ from $\mathbb{G}_x$ and $\mathbb{G}_y$ as translation windows; translating the translation windows $\mathbb{G}_x^{(1)}$ and $\mathbb{G}_y^{(1)}$ along negative semi-axis directions of the x axis and the y axis by a virtual array element interval one by one to obtain $P_x$ virtual uniform linear sub-arrays $\mathbb{G}_x^{(p_x)} = \{(x_{\mathbb{G}}^{(p_x)}, 0) | x_{\mathbb{G}}^{(p_x)} = [2-p_x, 3-p_x, \ldots, q_{\mathbb{G}_x}^{(|\mathbb{G}_x|)} + 1 - p_x]d\}$ and $P_y$ virtual uniform linear sub-arrays $\mathbb{G}_y^{(p_y)} = \{(0, y_{\mathbb{G}}^{(p_y)}) | y_{\mathbb{G}}^{(p_y)} = [2-p_y, 3-p_y, \ldots, q_{\mathbb{G}_y}^{(|\mathbb{G}_y|)} + 1 - p_y]d\}$, wherein $P_x = (|\mathbb{G}_x|+1)/2$, $P_y = (|\mathbb{G}_y|+1)/2$; then the virtual domain signal of the virtual uniform sub-array $\widetilde{\mathbb{G}}_{(p_x,p_y)} = \mathbb{G}_x^{(p_x)} \cup \mathbb{G}_y^{(p_y)}$ can be expressed as:

$$U_{\widetilde{\mathbb{G}}_{(p_x,p_y)}} = \sum_{k=1}^{K} \sigma_k^4 g_x^{(p_x)}(k) \circ g_y^{(p_y)}(k) \in \mathbb{C}^{|\mathbb{G}_x^{(p_x)}| \times |\mathbb{G}_y^{(p_y)}|},$$

wherein, $$g_x^{(p_x)}(k) = \left[e^{-j\pi(2-p_x)\mu_1(k)}, e^{-j\pi(3-p_x)\mu_1(k)}, \ldots, e^{-j\pi\left(q_{\mathbb{G}_x}^{(|\mathbb{G}_x|)}+1-p_x\right)\mu_1(k)}\right]^T,$$

$$g_y^{(p_y)}(k) = \left[e^{-j\pi(2-p_y)\mu_2(k)}, e^{-j\pi(3-p_y)\mu_2(k)}, \ldots, e^{-j\pi\left(q_{\mathbb{G}_y}^{(|\mathbb{G}_y|)}+1-p_y\right)\mu_2(k)}\right]^T,$$

are steering vectors of $\mathbb{G}_x^{(p_x)}$ and $\mathbb{G}_y^{(p_y)}$, respectively;

(5) for $P_y$ virtual uniform sub-arrays $\widetilde{\mathbb{G}}_{(p_x, :)}$ with the same subscript $p_x$, superimposing corresponding virtual domain signals $U_{\widetilde{\mathbb{G}}_{(p_x, :)}}$ of the $P_y$ virtual uniform sub-arrays $\widetilde{\mathbb{G}}_{(p_x, :)}$ in a third dimension to obtain $P_x$ three-dimensional coupled virtual domain tensors $\mathcal{U}_{(p_x)} \in \mathbb{C}^{|\mathbb{G}_x^{(p_x)}| \times |\mathbb{G}_y^{(1)}| \times P_y}$:

$$\mathcal{U}_{(p_x)} = \left[U_{\widetilde{\mathbb{G}}_{(p_x,1)}}, U_{\widetilde{\mathbb{G}}_{(p_x,2)}}, \ldots, U_{\widetilde{\mathbb{G}}_{(p_x,P_y)}}\right]_{\sqcup_3} =$$

$$\sum_{k=1}^{K} \sigma_k^4 g_x^{(p_x)}(k) \circ g_y^{(1)}(k) \circ q_y(k) = [\![\sigma_k^4; G_x^{(p_x)}, G_y^{(1)}, Q_y]\!],$$

wherein, $g_y^{(1)}(k)$ is a guiding vector of the translation window $\mathbb{G}_y^{(1)}$, $q_y(k) = [1, e^{j\pi\mu_2(k)}, \ldots, e^{j\pi(P_y-1)\mu_2(k)}]^T$ represents a translation factor along an axis direction of y, and $G_x^{(p_x)} = [g_x^{(p_x)}(1), g_x^{(p_x)}(2), \ldots, g_x^{(p_x)}(K)]$, $G_y^{(1)} = [g_y^{(1)}(1), g_y^{(1)}(2), \ldots, g_y^{(1)}(K)]$ and $Q_y = [q_y(1), q_y(2), \ldots, q_y(K)]$ are factor matrices of $\mathcal{U}_{(p_x)}$, $[\cdot]_{\sqcup_{a^{th}}}$ represents a tensor superposition operation on the $a^{th}$ dimension, and $[\![\cdot]\!]$ represents a canonical polyadic model of the tensor;

(6) performing a coupled canonical polyadic decomposition on the constructed $P_x$ coupled virtual domain tensors $\mathcal{U}_{(p_x)}$ to obtain an estimated value $\{\hat{G}_x^{(p_x)}, \hat{G}_y^{(1)}, \hat{Q}_y\}$ of the factor matrices $\{G_x^{(p_x)}, G_y^{(1)}, Q_y\}$, which includes an estimated value $\{\hat{g}_x^{(p_x)}(k), \hat{g}_y^{(1)}(k), \hat{q}_y(k)\}$ of a spatial factor $\{g_x^{(p_x)}(k), g_y^{(1)}(k), q_y(k)\}$; then, extracting a two-dimensional direction of arrival estimate result $(\hat{\theta}_k, \hat{\varphi}_k)$ from the estimated value $\{\hat{g}_x^{(p_x)}(k), \hat{g}_y^{(1)}(k), \hat{q}_y(k)\}$ of the spatial factor.

2. The method for estimating direction of arrival of an L-type coprime array based on coupled tensor decomposition according to claim 1, wherein the structure of the L-type coprime array with the separated sub-arrays in the step (1) is described as: the coprime linear array $\mathbb{L}_i$ constituting the L-type coprime array is composed of a pair of sparse uniform linear sub-arrays, the two sparse uniform linear sub-arrays respectively contain $2M_{\mathbb{L}_i}$ and $N_{\mathbb{L}_i}$ antenna elements, and the distances between the array elements are respectively $N_{\mathbb{L}_i}d$ and $M_{\mathbb{L}_i}d$, wherein, $M_{\mathbb{L}_i}$ and $N_{\mathbb{L}_i}$ are one pair of coprime integers; a sub-array combination is performed on the two sparse uniform linear sub-arrays in $\mathbb{L}_i$ by overlapping the first array elements to obtain a coprime linear array $\mathbb{L}_i$ containing $|\mathbb{L}_i| = 2M_{\mathbb{L}_i} + N_{\mathbb{L}_i} - 1$ array elements.

3. The method for estimating direction of arrival of an L-type coprime array based on coupled tensor decomposition according to claim 1, wherein in the derivation of the fourth-order statistic described in the step (2), the fourth-order covariance tensor $\mathcal{R} \in \mathbb{C}^{|\mathbb{L}_1| \times |\mathbb{L}_2| \times |\mathbb{L}_1| \times |\mathbb{L}_2|}$ based on sampling is obtained by calculating fourth-order statistics of the received signals $X_{\mathbb{L}_1}$ and $X_{\mathbb{L}_2}$ of the T sampling snapshots:

$$\hat{\mathcal{R}} = \left(\frac{1}{T} X_{\mathbb{L}_1} X_{\mathbb{L}_2}^H\right) \circ \left(\frac{1}{T} X_{\mathbb{L}_1} X_{\mathbb{L}_2}^H\right)^*.$$

4. The method for estimating direction of arrival of an L-type coprime array based on coupled tensor decomposition according to claim 1, wherein in the construction of the coupled virtual domain tensors described in step (5), the obtained $P_x$ virtual domain tensors $\mathcal{U}_{(p_x)}$ represent the same spatial information in a second dimension and a third dimension and different spatial information in a first dimension, the $P_x$ virtual domain tensors $\mathcal{U}_{(p_x)}$ have a coupling relationship in the second dimension and the third dimension, the first dimension represents angle information of the virtual uniform linear sub-arrays $\mathbb{G}_x^{(p_x)}$, the second dimension represents angle information of the translation window $\mathbb{G}_y^{(1)}$, and the third dimension represents translation information in the y axis direction.

5. The method for estimating direction of arrival of an L-type coprime array based on coupled tensor decomposition according to claim 1, wherein in the construction process of the coupled virtual domain tensors described in the step (5), the coupled virtual domain tensors are constructed by superimposing translational virtual domain signals in the x axis direction, comprising: for $P_x$ virtual uniform sub-arrays $\widetilde{\mathbb{G}}_{(:, p_y)}$ with the same subscript $p_y$ covering the same angle information in the y axis direction and having a spatial translation relationship in the x axis direction, superimposing virtual domain signals $U_{\widetilde{\mathbb{G}}_{(:, p_y)}}$ corresponding to the $P_x$ virtual uniform sub-arrays $\widetilde{\mathbb{G}}_{(:, p_y)}$ in the third dimension, so as to get $P_y$ virtual domain tensors $\mathcal{U}_{(p_y)} \in \mathbb{C}^{|\mathbb{G}_x^{(1)}| \times |\mathbb{G}_y^{(p_y)}| \times P_x}$;

$$\mathcal{U}_{(p_y)} = \left[U_{\tilde{\mathbb{G}}_{(1,p_y)}}, U_{\tilde{\mathbb{G}}_{(2,p_y)}}, \ldots, U_{\tilde{\mathbb{G}}_{(p_x,p_y)}}\right]_{\sqcup_3} =$$

$$\sum_{k=1}^{K} \sigma_k^4 g_x^{(1)}(k) \circ g_y^{(p_y)}(k) \circ q_x(k) = \left[\!\left[\sigma_k^4; G_x^{(1)}; G_y^{(p_y)}, Q_x\right]\!\right],$$

wherein, $g_x^{(1)}(k)$ is a steering vector of the translation window $\mathbb{G}_x^{(1)}$, $q_x(k)=[1, e^{j\pi\mu_1(k)}, \ldots, e^{j\pi(P_x-1)\mu_1(k)}]^T$ represents a translation factor along the x axis direction, $G_x^{(1)}=[g_x^{(1)}(1), g_x^{(1)}(2), \ldots, g_x^{(1)}(K)]$, $G_y^{(p_y)}=[g_y^{(p_y)}(1), g_y^{(p_y)}(2), \ldots, g_y^{(p_y)}(K)]$ and $Q_x=[q_x(1), q_x(2), \ldots, q_x(K)]$ are factor matrices of $\mathcal{U}_{(p_y)}$; the $P_y$ constructed three-dimensional virtual domain tensors $\mathcal{U}_{(p_y)}$ represent the same spatial information in the first and third dimensions and different spatial information in the second dimension, thus the virtual domain tensors $\mathcal{U}_{(p_y)}$ have a coupling relationship in the first and the third dimensions; the constructed $P_y$ three-dimensional virtual domain tensors $\mathcal{U}_{(p_y)}$ are decomposed by coupled canonical polyadic, and the factor matrices $\{G_x^{(1)}, G_y^{(p_y)}, Q_x\}$ of the $P_y$ constructed three-dimensional virtual domain tensors $\mathcal{U}_{(p_y)}$ are estimated, wherein the first dimension represents the angle information of the translation window $\mathbb{G}_x^{(1)}$, the second dimension represents the angle information of the virtual uniform linear sub-arrays $\mathbb{G}_y^{(p_y)}$, and the third dimension represents the translation information in the x-axis direction.

6. The method for estimating direction of arrival of an L-type coprime array based on coupled tensor decomposition according to claim 1, wherein in the decomposition of the coupled virtual domain tensors in the step (6), the coupling relationship of the constructed $P_x$ three-dimensional virtual domain tensors $\mathcal{U}_{(p_x)}$ is utilized, the coupled canonical polyadic decomposition is performed on $\mathcal{U}_{(p_x)}$ via a joint least-squares optimization problem:

$$\left\{\hat{G}_x^{(p_x)}, \hat{G}_y^{(1)}, \hat{Q}_y\right\} = \min_{\hat{G}_x^{(p_x)}, \hat{G}_y^{(1)}, \hat{Q}_y} \sum_{p_x} \left\|\mathcal{U}_{(p_x)} - \left[\!\left[\hat{G}_x^{(p_x)}, \hat{G}_y^{(1)}, \hat{Q}_y\right]\!\right]\right\|_F^2,$$

wherein, $\|\cdot\|_F$ represents the Frobenius norm; solving the joint least squares optimization problem to obtain the estimated value $\{\hat{G}_x^{(p_x)}, \hat{G}_y^{(1)}, \hat{Q}_y\}$ of the factor matrices $\{G_x^{(p_x)}, G_y^{(1)}, Q_y\}$; in the coupled virtual domain tensor decomposition problem, the maximum number of identifiable targets K is $|\mathbb{G}_x^{(p_x)}|+P_y-2$, which exceeds the actual number of the physical array elements of the constructed L-type coprime array with separated sub-array.

7. The method for estimating direction of arrival of an L-type coprime array based on coupled tensor decomposition according to claim 1, wherein in the step (6), for the estimated space factor $\{\hat{g}_x^{(p_x)}(k), \hat{g}_y^{(1)}(k), \hat{q}_y(k)\}$, the parameters $\hat{\mu}_1(k)$ and $\hat{\mu}_2(k)$ are extracted from the estimated space factor $\{\hat{g}_x^{(p_x)}(k), \hat{g}_y^{(1)}(k), \hat{q}_y(k)\}$:

$$\hat{\mu}_1(k) = \left(\sum_{p_x} v_{(p_x)}^\dagger \angle(\hat{g}_x^{(p_x)}(k))/\pi\right)/P_x,$$

$$\hat{\mu}_2(k) = \left(w_{(1)}^\dagger \angle(\hat{g}_y^{(1)}(k))/\pi + z^\dagger \angle(\hat{q}_y(k))/\pi\right)/2,$$

wherein, $v_{(p_x)}=[2-p_x, 3-p_x, \ldots, q_{\mathbb{G}_x}^{(|\mathbb{G}_x|)}+1-p_x]^T$ is a position index of each virtual array element in $\mathbb{G}_x^{(p_x)}$, $w_{(1)}=[1, 2, \ldots, q_{\mathbb{G}_y}^{(|\mathbb{G}_y|)}]^T$ is a position index of each virtual array element in $\mathbb{G}_y^{(1)}$, $z=[0, 1, \ldots, P_y-1]^T$ represents a translation step, $\angle(\cdot)$ represents a complex argument taking operation, $(\cdot)^\dagger$ represents a pseudo-inverse operation; finally, according to the relationship of $\{\mu_1(k), \mu_2(k)\}$ and the two-dimensional direction of arrival $(\theta_k, \varphi_k)$, that is, $\mu_1(k)=\sin(\varphi_k)\cos(\theta_k)$ and $\mu_2(k)=\sin(\varphi_k)\sin(\theta_k)$, a closed-form solution of the two-dimensional direction of arrival estimation $(\hat{\theta}_k, \hat{\varphi}_k)$ is obtained as:

$$\hat{\theta}_k = \arctan\left(\frac{\hat{\mu}_2(k)}{\hat{\mu}_1(k)}\right),$$

$$\hat{\varphi}_k = \sqrt{\hat{\mu}_1(k)^2 + \hat{\mu}_2(k)^2}.$$

\* \* \* \* \*